W. H. STARTZMAN.
Cultivator.

No. 83,564.

Patented Oct. 27, 1868.

WITNESSES:

INVENTOR:

WILLIAM H. STARTZMAN, OF BIG LICK, VIRGINIA.

Letters Patent No. 83,564, dated October 27, 1868.

IMPROVEMENT IN CULTIVATORS.

The Schedule referred to in these Letters Patent and making part of the same.

*To all whom it may concern:*

Be it known that I, WILLIAM H. STARTZMAN, of Big Lick, in the county of Roanoke, and in the State of Virginia, have invented certain new and useful Improvements in Cultivators; and do hereby declare that the following is a full, clear, and exact description thereof, reference being had to the accompanying drawings, and to the letters of reference marked thereon.

The nature of my invention consists in the general arrangement of a cultivator with reversible and self-sharpening blades or teeth.

In order to enable others skilled in the art to make and use my invention, I will now proceed to describe its construction and operation, referring to the annexed drawings, which form a part of this specification, and in which—

Figure 1:
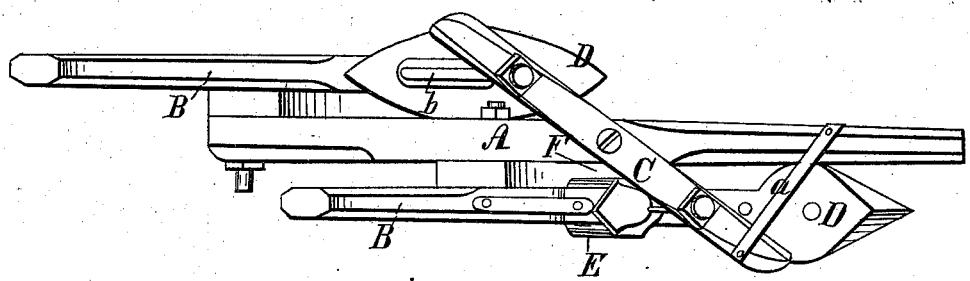
Figure 2:
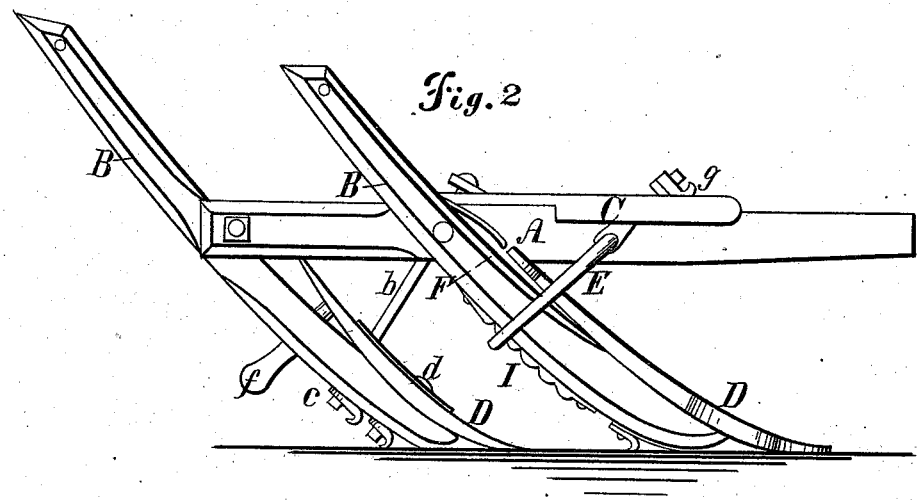

Figure 1 is a plan view, and
Figure 2 a side view.

A represents a plow-beam of suitable shape and dimensions, to which the shanks B B are secured, the upper ends of which form the handles to the plow. To the lower ends of said shanks the teeth or blades D D are fastened, by such means as will hereinafter be described.

I make a variety of double teeth or blades, which are reversible, so that when one end is worn, the other can be turned, or they may be turned or shifted to suit the kind of work for which the different shapes are made. The ends of the teeth or blades may be formed alike or differently, as may be desirable.

The upper side of the blades is provided with a bevelled rim along the edges, which slants gradually upwards, at last merging entirely into the blade, as shown in fig. 1. By this arrangement the blades are made shelf-sharpening, that is, the wear on the edges of the blades maintains always a sharp edge thereon, obviating the necessity of taking them off so often to be sharpened.

This rim may be on the under side of the blade, instead of on the upper, if desired. Obliquely on top of the beam A, I place a cross-bar, C, which is steadied by means of one or two stays $a$, running from its ends to said beam. From the ends of this cross-bar C, a rod, $b$, passes through the blade D and shank B, and is secured on the rear side of the shank by a nut, $c$, which serves to brace and strengthen the shank.

The blade D is secured to the shank by a screw-bolt, $d$, passing through them, and held by a nut, $e$; and from the rear side of the shank a set-screw, $f$, is inserted, which passes through the shank, striking the upper portion of the blade, which serves to regulate the set of the upper end of the blade.

By throwing out the upper end of the tooth or blade, the lower end is thrown in, and run deeper into the earth.

Instead of the rod $b$, I may fasten a stirrup, E, to the end of said cross-bar, by means of screw-bolt and nut $g$, which stirrup passes around the shank, and can be held in any position desired, by placing it in any one of the notches of the ratch-bar I, which is fastened to the rear side of the shank, and tightening the nut $g$ on top of the cross-bar.

Instead of the set-screw $f$, I may use a wedge, F, to be inserted between the shank and the upper end of the blade, thereby regulating the set of the blade.

Having thus fully described my invention,

What I claim as new, and desire to secure by Letters Patent, is—

The arrangement of the standards B B, oblique bar C, rack-bar I, and keeper E, with nuts $g$ and plows D, all as herein set forth.

In testimony that I claim the foregoing, I have hereunto set my hand, this 24th day of June, 1868.

WILLIAM H. STARTZMAN.

Witnesses:
WM. M. BARNIT,
R. B. MOORMAN.